(12) United States Patent
Kim

(10) Patent No.: US 7,591,885 B2
(45) Date of Patent: Sep. 22, 2009

(54) WET TYPE AIR CLEANER

(75) Inventor: Woong Kim, Seoul (KR)

(73) Assignee: Daewoo Electronics Corporation, Seoul (KR)

( * ) Notice: Subject to any disclaimer, the term of this patent is extended or adjusted under 35 U.S.C. 154(b) by 686 days.

(21) Appl. No.: 11/272,673

(22) Filed: Nov. 15, 2005

(65) Prior Publication Data

US 2006/0102003 A1  May 18, 2006

(30) Foreign Application Priority Data

Nov. 17, 2004  (KR) .................... 10-2004-0094309

(51) Int. Cl.
*B01D 47/00* (2006.01)

(52) U.S. Cl. .............. 96/284; 96/286; 95/218

(58) Field of Classification Search ............ 96/284, 96/281, 286; 261/35, 91; 122/28, 33, 158; 95/218

See application file for complete search history.

(56) References Cited

U.S. PATENT DOCUMENTS 2,527,015 A * 10/1950 Lhota ................... 261/91
3,421,745 A * 1/1969 Prupis .................. 261/35
4,686,940 A   8/1987 Fullemann
2003/0005825 A1  1/2003 Hogan
2006/0096460 A1 * 5/2006 Kim ..................... 96/283

FOREIGN PATENT DOCUMENTS

| DE | 20312576 | 12/2003 |
| GB | 392909 | 5/1933 |
| GB | 904606 | 8/1962 |
| WO | 1999/051324 | 10/1999 |
| WO | WO 2006/049467 A1 | 5/2006 |

* cited by examiner

*Primary Examiner*—Duane Smith
*Assistant Examiner*—Ives Wu
(74) *Attorney, Agent, or Firm*—Bacon & Thomas, PLLC

(57) ABSTRACT

A wet type air cleaner includes a purification unit installed in a housing. The purification unit includes a blower unit for directing air to cleaning water in the bottom of the housing, an inner guide for drawing up the cleaning water in the bottom of the housing, and a nozzle portion for radially dispersing the cleaning water drawn up by the inner guide. The air directed by the blower unit flows through the dispersed cleaning water. An outer guide is disposed for guiding the directed air and the dispersed cleaning water into the cleaning water in the bottom of the housing. The blower unit, the inner guide and the outer guide are together rotated by a driving unit. The inner guide has a central portion and a spiral guide portion disposed on an outer surface of the central portion.

5 Claims, 3 Drawing Sheets

WET TYPE AIR CLEANER

FIELD OF THE INVENTION

The present invention relates to an air cleaner; and, more particularly, to a wet type air cleaner with a purification unit for dispersing cleaning water and directing air to flow through the dispersed cleaning water, which is provided with an guide for drawing up the cleaning water by using a centrifugal force.

BACKGROUND OF THE INVENTION

In general, an air cleaner serves to purify indoor air containing fine dusts, various noxious gases, various germs, molds, viruses, etc., by using a purification medium. Such an air cleaner can be used through all seasons because it has various functions of removing unpleasant odors and small particles such as ticks, pollen and furs of pets, preventing an outbreak of disease due to an aerial infection, and so forth as well as its principal function of maintaining indoor air clean and pleasant.

Air cleaners can be largely classified into two types: dry type and wet type. Dry type air cleaners can be divided again into a filter type and an electric dust collection type.

Here, the electric dust collection type uses no filter, so it has a merit in that there is no need to replace filters. However, if dusts are accumulated on an electric dust collecting plate, purifying efficiency of the air cleaner will be deteriorated, and dust removing capacity thereof will also be undermined.

As for the filter type air cleaner, on the other hand, since various fine particles are captured while air passes through filters, the filter type air cleaner exhibits a high purifying efficiency, and thus is adequate for use in a season when yellow dust comes. However, since the filters need to be replaced periodically, maintenance cost thereof is high.

Meanwhile, a wet type air cleaner employs a method for making floating particles in suctioned air deposited in water by allowing the suctioned air to contact water. Though the wet type air cleaner has not been commonly utilized yet, it has many advantages in that it does not requires a replacement of filters and generates little noise, while providing a humidifying function as well. Thus, for children, its use is preferred. However, when using the wet type air cleaner, water should be replaced or replenished, which would be rather cumbersome.

There has been proposed a wet type air cleaner having a simple structure in which cleaning water is stored in a certain space, and a blower unit and a water spray unit are installed in a same space. One of such wet type air cleaners is disclosed in Japanese Patent Laid-open Publication No. 2000-334240, entitled "WET TYPE AIR CLEANER".

The wet type air cleaner includes an air circulation passage through which air is introduced into the inside of the air cleaner and then is outputted to the outside after being purified. A reservoir containing therein liquid to be sprayed is formed in a part of the air circulation passage. The air cleaner further includes a blower unit for allowing the air to be circulated through the air circulation passage and a spray unit for spraying the liquid into a spray space in the reservoir.

The blower unit includes a fan for suctioning the air into the spray space and a motor for driving the fan. The spray unit includes a pump for pumping up the liquid from the reservoir and a nozzle for spraying the liquid into the spray space.

Further, the air supplied into the air circulation passage typically flows downward after being introduced into the reservoir from upside, whereas the liquid is sprayed upward from downside. Therefore, the air introduced into the reservoir is brought into contact with fine liquid particles sprayed by the nozzle, thereby allowing noxious substances in the air to be adsorbed by the liquid.

In the conventional wet type air cleaner as described above, however, the blower unit for circulating the indoor air and the spray unit for spraying the liquid are installed individually. Therefore, separate motors are required to operate the blower unit and the spray unit, respectively, which increases the number of components of the air cleaner, resulting in a high manufacturing const. Further, since the water is sprayed through the nozzle against the inner surface of the spray space, a high level of noise is caused.

Besides, in the conventional wet type air cleaner, droplets adsorbing fine dust are discharged to the outside together with the air, thereby resulting in a poor purification efficiency and an unexpected high humidity. Moreover, the contact between the cleaning water and the air is insufficient, so that the purification ability thereof is deteriorated.

SUMMARY OF THE INVENTION

It is, therefore, an object of the present invention to provide a wet type air cleaner with a purification unit for dispersing cleaning water and directing air to flow through the dispersed cleaning water, which is provided with an guide for drawing up the cleaning water by using a centrifugal force.

In accordance with the present invention, there is provided a wet type air cleaner including: a housing storing cleaning water in a bottom portion thereof; and a purification unit installed in the housing, the purification unit including: a blower unit for directing air to the cleaning water in the bottom of the housing; an inner guide for drawing up the cleaning water in the bottom of the housing; a nozzle portion for dispersing radially the cleaning water drawn up by the inner guide, the air directed by the blower unit flowing through the dispersed cleaning water; and an outer guide for guiding the directed air and the dispersed cleaning water into the cleaning water in the bottom of the housing, the outer guide surrounding the inner guide to form a gap therebetween, wherein the blower unit, the inner guide and the outer guide are together rotated by a driving unit.

Preferably, the inner guide has a central portion and a guide portion disposed on an outer surface of the central portion, and a lower inlet of the guide portion is submerged in the cleaning water stored in the bottom of the housing.

Preferably, the guide portion is spirally disposed on the outer surface of the central portion.

Preferably, the nozzle portion is connected to the inner guide to communicate with an outlet of the guide portion.

Preferably, a plurality of ribs, spaced apart from each other, are formed on an inner surface of the guide portion in order to facilitate to draw up the cleaning water.

Preferably, the blower unit is fixed on a rotation shaft of the driving unit and the nozzle portion is fixed to the blower unit such that the nozzle portion and the inner guide are together rotated with the blower unit.

Preferably, the blower unit and the central portion of the inner guide are fixed on a rotation shaft of the driving unit such that the blower unit, the inner guide and the nozzle portion are together rotated with the rotation shaft.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

Hereinafter, a wet type air cleaner in accordance with a preferred embodiment of the present invention will be described in detail with reference to the accompanying drawings.

Figure 1:
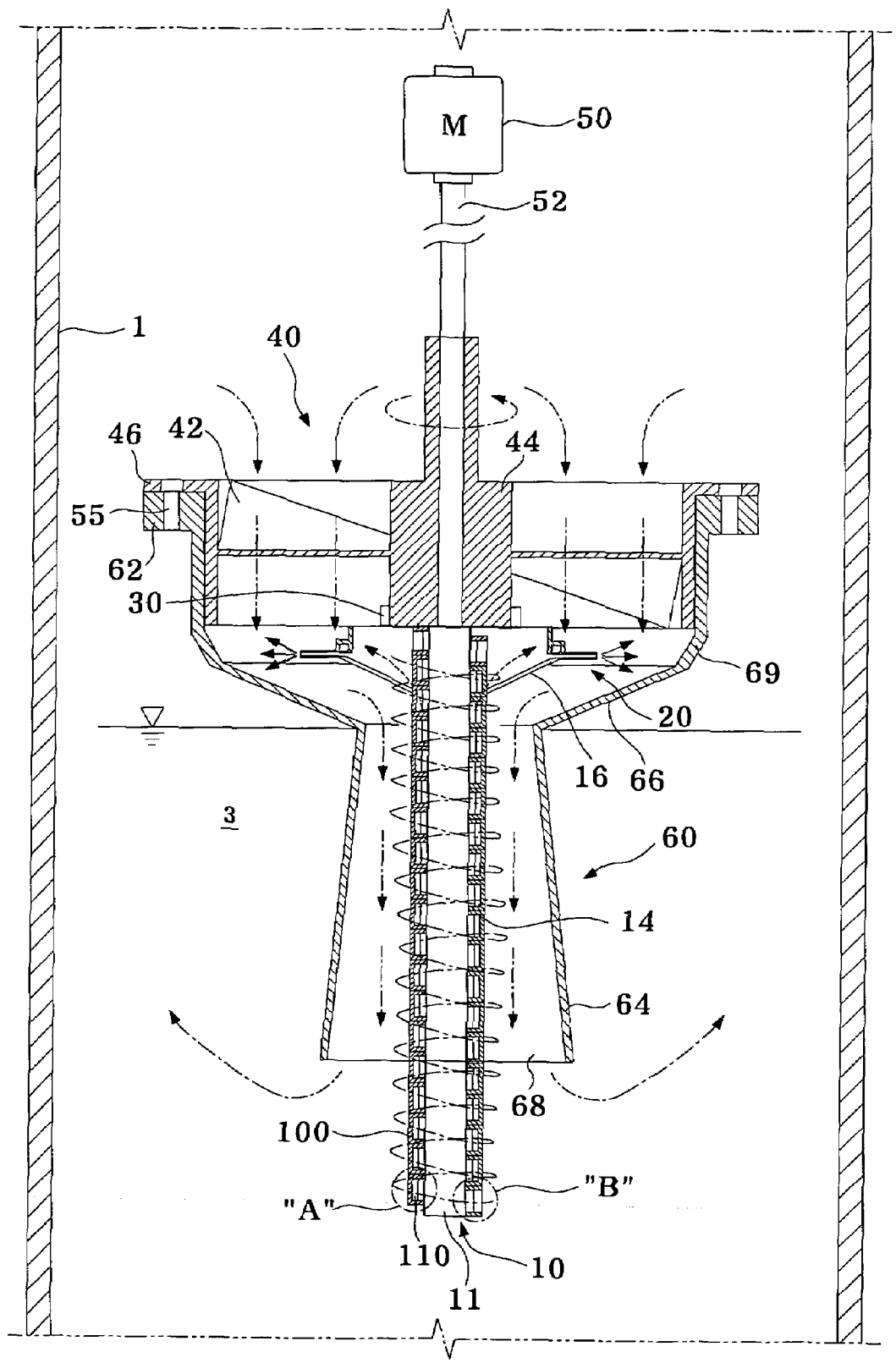
FIG. 1 sets forth a cross sectional view of a purification unit for use in a wet type air cleaner in accordance with a preferred embodiment of the present invention.
Figure 2:
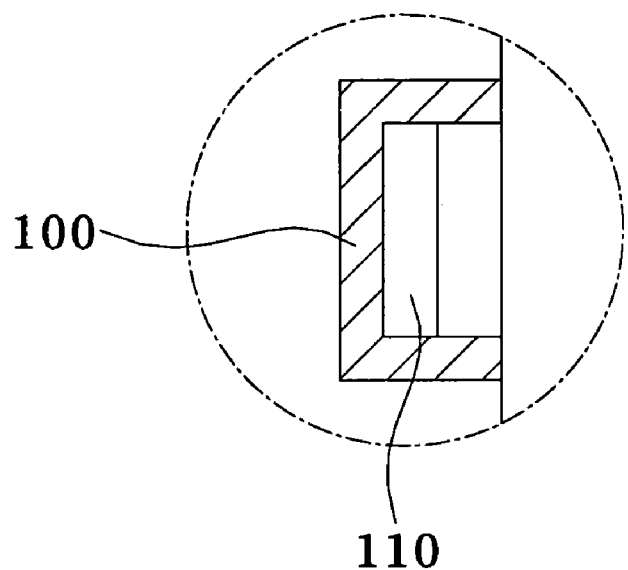
FIG. 2 presents an enlarged view of part "A" in FIG. 1.
Figure 3:
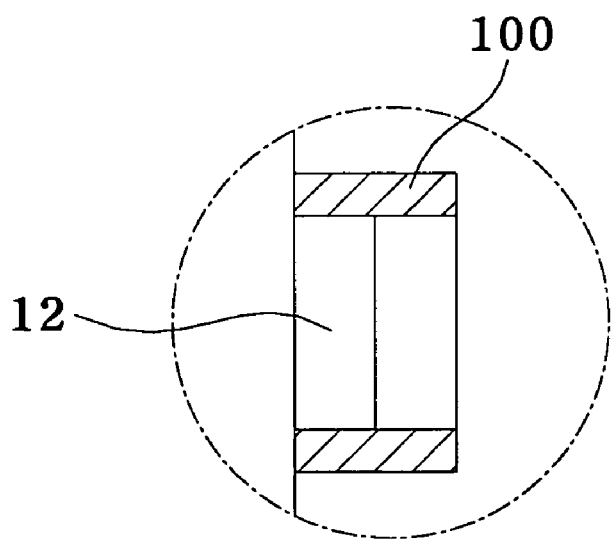
FIG. 3 depicts an enlarged view of part "B" in FIG. 1.
Figure 4:
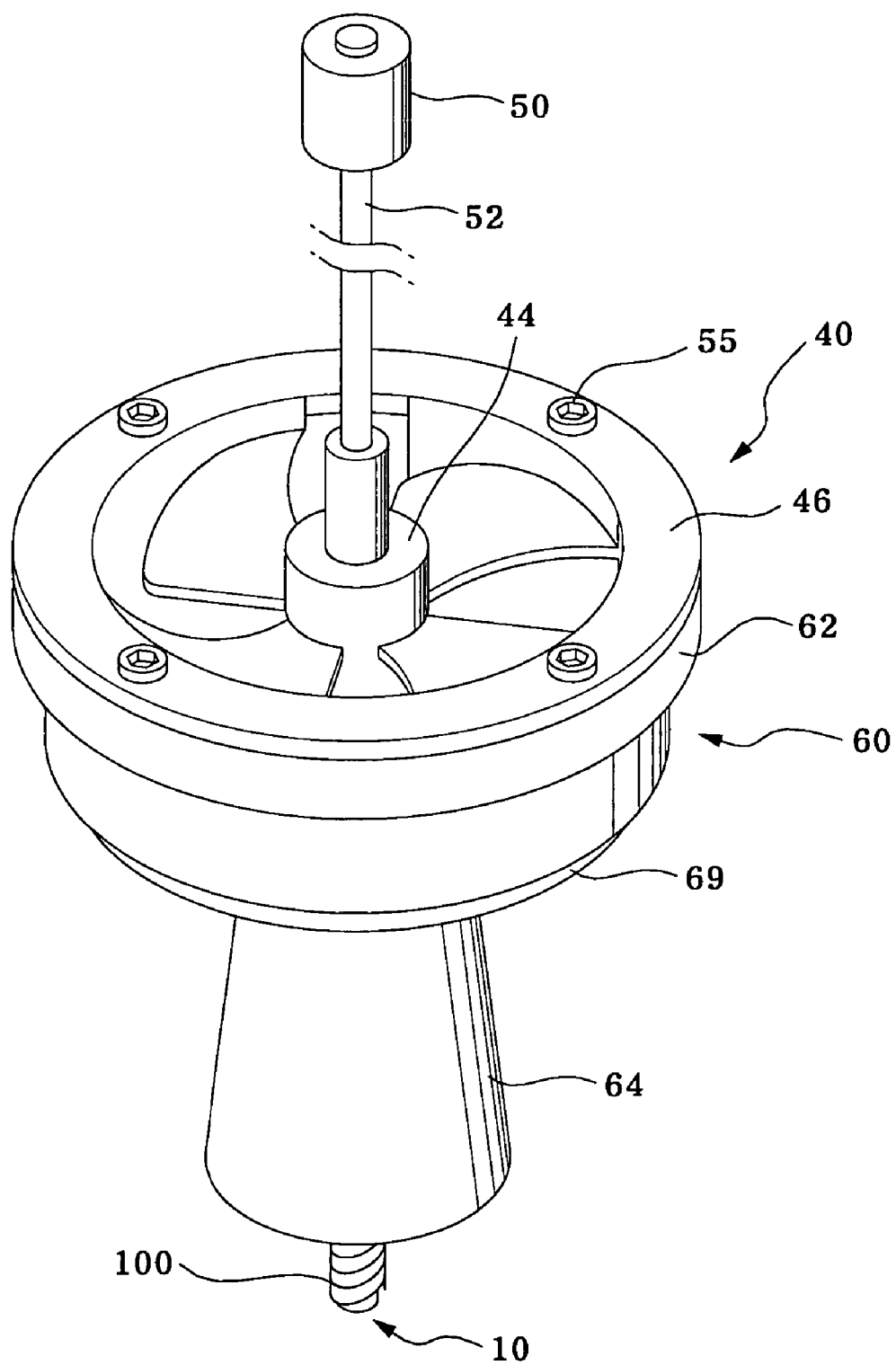
FIG. 4 provides a perspective view of the purification unit of the wet type air cleaner in FIG. 1.

FIG. 1 is a cross sectional view of a purification unit for use in a wet type air cleaner in accordance with the preferred embodiment of the present invention, FIGS. 2 and 3 show enlarged views of parts "A" and "B" in FIG. 1; and FIG. 4 depicts a perspective view of the purification unit in FIG. 1.

As shown in FIG. 1, the purification unit is installed in a housing 1 with an air inlet (not shown) and an air outlet (not shown), the housing 1 storing cleaning water in the bottom thereof. The purification unit includes a blower unit 40 for directing air introduced through the air inlet into the housing 1 to the cleaning water in the bottom of the housing 1; an inner guide 10 for drawing up the cleaning water in the bottom of the housing 1; and a nozzle portion 20 for dispersing radially the cleaning water; and an outer guide 60 for guiding the directed air and the dispersed cleaning water into the cleaning water in the bottom of the housing 1.

The blower unit 40 includes a body portion 44 fixed on a rotation shaft 52 of a motor 50, a plurality of blades 42 disposed around the body portion 44, and a frame 45 fixed to the outer ends of the blades 42 to surround them.

When the rotation shaft 52 of the motor 50 is rotated, the blower unit 40 is rotated therewith, so that the air introduced through the air inlet into the housing 1 is drawn by the rotation of the blades 42 to flow therethourgh downward.

The inner guide 10 has a hollow central portion 11 and a guide portion 100 disposed around the outer surface of the central portion 11. Preferably, the guide portion 100 is spirally disposed around the outer surface of the central portion 11. An inlet 12 of the guide portion 100 is submerged in the cleaning water stored in the bottom of the housing 1, and the guide portion 100 forms a water flow path along which the cleaning water is moved up.

Formed on the inner surface of the guide portion 100 are a plurality of ribs 110 disposed apart from each other at regular intervals, which serve to push up the cleaning water drawn along the inner surface of the guide portion 100 by the centrifugal force.

The nozzle portion 20 is provided at the top end of the inner guide 10 such that it communicates with the outlet of the guide portion 100 and the inside of the hollow central portion 11. The nozzle portion 20 is fixedly attached to the body portion 44 of the blower unit 40 by using a coupling member 30. Therefore, when the rotation shaft 52 of the motor 50 is rotated, the nozzle portion 20 and the inner guide 10 are also rotated with the blower unit 40, so that the cleaning water near the inlet 12 of the guide portion 100 is suctioned thereinto to be drawn up along the guide portion 100 by a centrifugal force exerted thereto and is then dispersed radially through the nozzle portion 20 to contact with the air directed dowanwardly by the blades 42 of the blower unit 40. Although the nozzle portion 20 is fixed to the blower unit 40 in this embodiment, the central portion 11 of the inner guide 10 may be fixed on the rotation shaft 52 to be rotated therewith instead of the above configuration.

Further, an outer guide 60 includes a fixed portion 63 fixed to the frame 45 of the blower unit 40 and an upper outer portion 66 and a lower outer portion 64 disposed around the inner guide 10 to form a gap therebetween, such that the air directed by the blades 42 and the dispersed cleaning water from the nozzle portion 20 are guided through the gap into the cleaning water in the housing 1.

The upper outer portion 66 is extended downwardly such that its inner diameter is gradually decreased downwardly and the lower outer portion 64 is extended downwardly such that its inner diameter is gradually increased downwardly.

The cleaning water preferably lies at the same level as the connection point of the upper outer portion 66 and the lower outer portion 64.

The fixed portion 63 of the outer guide 60 has a lower flange 62 with a plurality of holes and the frame 45 of the blower unit 40 has an upper flange 46 with a plurality of holes. The lower flange 62 and the upper flange 46 are coupled to each other by fastening screws 55 fitted into the corresponding holes thereof.

The fixed portion 63 and the upper outer portion 66 are connected to each other via a slanted reflecting wall 69. The reflecting wall 69 is disposed to reflect the cleaning water dispersed from the nozzle portion 20 upwardly toward the blades 42 of the blower unit 40.

The blower unit 40, the inner guide 10 and the outer guide 60 are rotated together by the rotation of the rotation shaft 52 of the motor 50.

The inlet 12 of the guide portion 100 is located below an outlet 68 at the end of the lower outer portion 64, so that the contaminated water discharged through the outlet 68 is prevented from being drawn up through the inlet 12 of the guide portion 100.

Hereinafter, there will be described an operation of the purification unit in accordance with the above preferred embodiment of the present invention.

When the rotation shaft 52 is rotated by the motor 50, the blower unit 40, the inner guide 10 and the outer guide 60 are together rotated with the rotation shaft 52.

The air is suctioned by the rotation of the blades 42 to be directed downwardly therethrough. The cleaning water near the inlet 12 of the guide portion 100 of the inner guide 10 is introduced into the inlet 12 of the guide portion 100 and is drawn up along the spiral guide portion 100 by the rotation of the inner guide 10. The cleaning water is injected through the outlet of the guide portion 100 into the nozzle portion 20 and then dispersed radially therethrough. The air directed downwardly passes through the dispersed cleaning water to be first purified. That is, foreign materials such as the bacteria, dirt and the like in the air are adsorbed by the dispersed cleaning water.

When the water is finely dispersed, negative ions are generated due to the Lenard effect. The amount of the negative ions is greater than those generated by a high-pressure discharge and, also, such generated negative ions are close to natural negative ions.

The dispersed cleaning water from the nozzle portion 20 collides with the reflecting wall 69 and is scattered to be mixed with the air. At this time, the space wherein the dispersed water collides with the reflecting wall 69 is confined, so that the noise generated by the collision of the water is nearly transferred to the outside, thereby providing a relatively quiet environment.

Further, some of the scattered water droplets are moved upwardly to contact with the blades 42 and the air flowing therethrough, so that foreign materials in the air are adsorbed by the water droplets.

The water droplets adsorbing the foreign materials are dropped onto and flows along the inner surface of the upper outer portion 66 downwardly.

The water droplets and the air directed downwardly by the blower unit 40 pass through the gap 80 to be discharged through the outlet 68 into the cleaning water in the bottom of the housing 1. The water droplets and foreign materials in the air are merged into the water in the bottom of the housing 1, and the clean air passes through the water to be discharged through the air outlet to the outside.

The air flowing through the water in the gap 80 is mixed with the water by the rotation of the lower outer portion 64, thereby facilitating the adsorption of the foreign materials in the air by the water.

In accordance with the wet type air cleaner employing the purification unit of the present invention, by the rotational force of the motor, the blower unit, the inner guide and the outer guide are together rotated, so that the cleaning water in the bottom of the housing can be pumped up without a separate pump, thereby resulting in a decreased manufacturing cost thereof. Further, the air directed downwardly contacts with the cleaning water several times, thereby increasing the purification efficiency thereof.

Moreover, the inner guide is provided with the spiral guide portion formed on the outer surface of the central portion to thereby facilitate to draw up the cleaning water in the bottom of the housing.

While the invention has been shown and descried with respect to the preferred embodiments, it will be understood by those skilled in the art that various changes and modifications may be made without departing from the spirit and scope of the invention as defined in the following claims.

What is claimed is:

1. A wet type air cleaner comprising:
   a housing storing cleaning water in a bottom portion thereof; and
   a purification unit installed in the housing, the purification unit including:
   a blower unit for directing air to the cleaning water in the bottom of the housing;
   an inner guide for drawing up the cleaning water in the bottom of the housing;
   a nozzle portion for dispersing radially the cleaning water drawn up by the inner guide, the air directed by the blower unit flowing through the dispersed cleaning water; and
   an outer guide for guiding the directed air and the dispersed cleaning water into the cleaning water in the bottom of the housing, the outer guide surrounding the inner guide to form a gap therebetween,
   wherein the blower unit, the inner guide and the outer guide are together rotated by a driving unit,
   wherein the inner guide has a central portion and a guide portion disposed on an outer surface of the central portion, and an inlet of the guide portion is submerged in the cleaning water stored in the bottom of the housing, and
   wherein a plurality of ribs, spaced apart from each other, are formed on an inner surface of the guide portion in order to facilitate drawing up the cleaning water.

2. The air cleaner of claim 1, it wherein the guide portion is spirally disposed on the outer surface of the central portion.

3. The air cleaner of claim 1, wherein the nozzle portion is connected to the inner guide to communicate with an outlet of the guide portion.

4. The air cleaner of claim 1, wherein the blower unit is fixed on a rotation shaft of the driving unit and the nozzle portion is fixed to the blower unit such that the nozzle portion and the inner guide axe together rotated with the blower unit.

5. The air cleaner of claim 1, wherein the blower unit and the central portion of the inner guide are fixed on a rotation shaft of the driving unit such that the blower unit, the inner guide and the nozzle portion are together rotated with the rotation shaft.

* * * * *

UNITED STATES PATENT AND TRADEMARK OFFICE
CERTIFICATE OF CORRECTION

| | |
|---|---|
| PATENT NO. | : 7,591,885 B2 |
| APPLICATION NO. | : 11/272673 |
| DATED | : September 22, 2009 |
| INVENTOR(S) | : Woong Kim |

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 974 days.

Signed and Sealed this

Fourteenth Day of December, 2010

David J. Kappos
*Director of the United States Patent and Trademark Office*